June 16, 1925.

E. E. WINKLEY 1,541,884

MACHINE FOR USE IN THE MANUFACTURE OF SHOES

Filed Aug. 22, 1919

Witness
H. C. Bowser

Inventor
Erastus E. Winkley
By Van Everen Fish & Hildreth
Attys

E. E. WINKLEY

MACHINE FOR USE IN THE MANUFACTURE OF SHOES

Filed Aug. 22, 1919

Witness
H. C. Bowser

Inventor
Erastus E. Winkley
by Van Everen Fish & Aldrich
Attys

Patented June 16, 1925.

1,541,884

UNITED STATES PATENT OFFICE.

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE MANUFACTURE OF SHOES.

Application filed August 22, 1919. Serial No. 319,272.

*To all whom it may concern:*

Be it known that I, ERASTUS E. WINKLEY, a citizen of the United States, residing at Lynn, in the county of Essex and State of Massachusetts, have invented certain new and useful Improvements in a Machine for Use in the Manufacture of Shoes; and I do hereby declare the following to be a full, clear, and exact description of the invention, such as will enable others skilled in the art to which it appertains, to make and use the same.

This invention relates to machines for use in the manufacture of shoes and more particularly to machines for use in the manufacture of shoes having short outsoles.

In shoe bottoms composed of a heel and a short outsole, the base of the heel is recessed or cut away adjacent to the breast end thereof to receive the rear or heel-seat end of the outsole, the rear extremity of the sole and the recess in the heel being severally so shaped that the former will exactly fit into the latter. Inasmuch as the sole is laid on the shoe before the heel is attached, it is essential that the rear end of the sole shall be accurately located in a predetermined position with respect to the rear of the shoe in order that the heel, when subsequently adjusted in assembled relation with the sole, shall be properly positioned relatively to the upper.

The principal object of the present invention is to provide means for insuring the proper location of the rear or heel seat end of a short outsole with respect to the rear of the shoe.

With this object in view a feature of the invention consists in the provision of a locating or gaging device for engaging the edge of a short outsole at the heel seat end thereof to locate the sole in its own plane relatively to a shoe prior to the securing of the sole to the shoe. In its preferred form this feature of the invention consists in the provision of means especially designed for determining the exact location, both longitudinally and transversely with respect to a shoe, of the heel-seat end of a short outsole such as that illustrated and described in Patent No. 1,396,801, issued Nov. 15, 1921 on my application. In the illustrated machine the positioning of the heel-seat end of the sole is effected by means of gage members which are adapted to be manually moved into operative position before the sole is placed on the shoe and are automatically retracted from the shoe before the application of pressure to the sole. It is to be understood, however, that the invention is not limited to the specific construction and arrangement shown except in so far as defined in the claims.

Other objects of the invention are to provide improved means for accurately locating the forepart of a sole upon a shoe, to provide improved means for securing the sole to the shoe, and to provide a shoe-supporting jack of improved construction which may be moved into a different angular position relatively to the machine after the shoe has been operated upon, in order to facilitate the removal of the shoe from the jack and the placing of another shoe thereon. The features of the invention by means of which these objects are obtained are not limited to use in connection with the manufacture of shoes having short outsoles but are also adapted for use in operating upon shoes having ordinary or full length outsoles.

The invention further consists in certain constructions, combinations and arrangements of parts hereinafter described and claimed, the advantages of which will be obvious to those skilled in the art.

A sole laying machine embodying the various features of the present invention in their preferred form is illustrated in the accompanying drawings, in which:—

Figure 2:
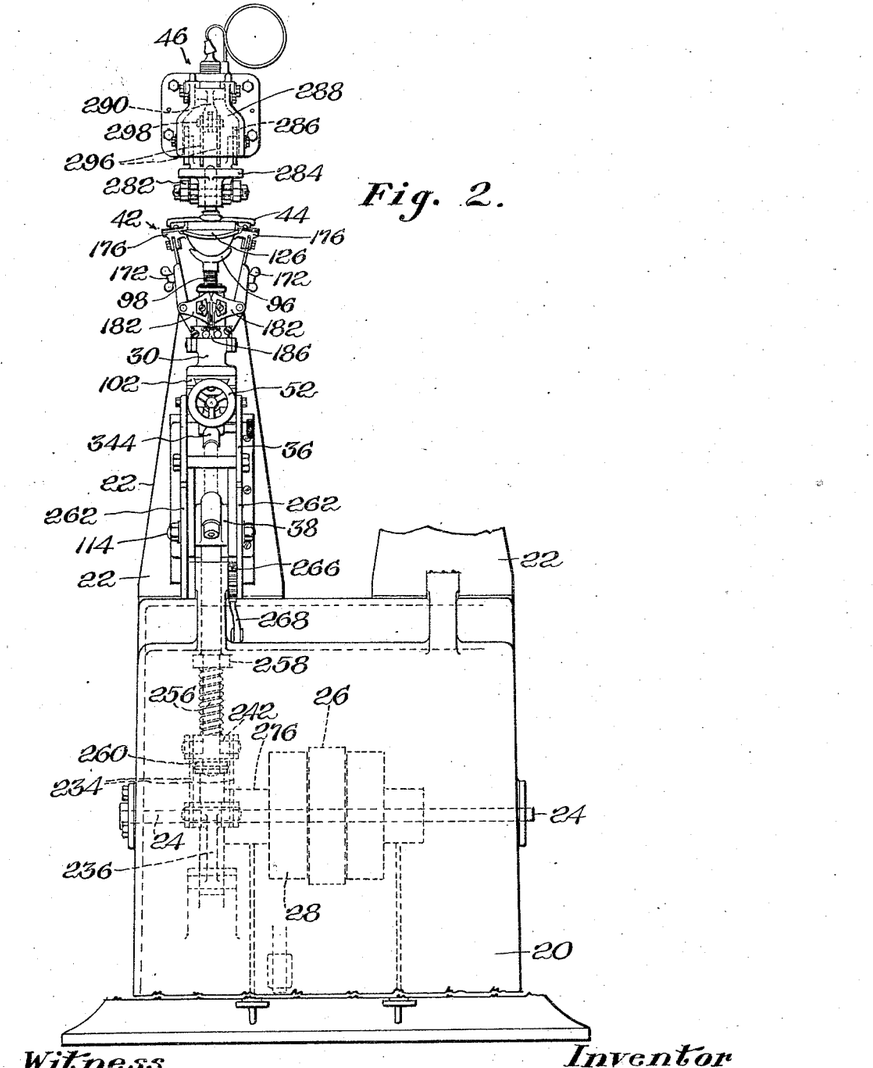
Fig. 2 is a view in front elevation of the machine with portions thereof broken away.

The present invention in its preferred form is embodied in a double machine which is adapted to operate upon right and left shoes. To this end two groups of operating mechanism are arranged side by side and supported upon a frame comprising a base or body portion 20 having twin standards 22 rising therefrom. Both groups of mechanism being similar in construction and mode of operation, one group only is illustrated in its entirety in the drawings. A stationary shaft 24 is supported in the base 20 and the machine is driven by a driving pulley 26 which is rotatably mounted at the middle of said shaft and is adapted to be connected with any suitable source of power. In order that the mechanism on one side of the machine may be driven independently of the mechanism on the opposite side thereof a suitable treadle controlled one revolution clutch member 28 is rotatably mounted on the shaft 24, at either side of the pulley 26, as shown in Fig. 2, and each clutch member 28 is adapted to connect the associated operating mechanism with the driving pulley 24 when actuated by its treadle, as occasion may require.

The mechanism illustrated comprises, in general, a shoe supporting jack 30 comprising a heel support 32 and a toe support 34; a jack-carrier 36 to which the heel and toe supports are adjustably secured and which is mounted for oscillatory movement so that the jack may be swung to and from a convenient shoe receiving position; a head 38 to which the carrier 36 is pivotally secured and which is adapted for vertical reciprocatory movement so that a shoe which has been placed upon the jack and upon which an outsole has been located may be moved to and from pressure receiving position; a gaging device 40 which is supported above the carrier 36 and serves to determine the position of the rear or heel seat end of the sole with respect to the shoe; a locating or centering device 42 that is mounted on the toe support 34 and is adapted to center the forepart of the sole upon the shoe; a sole-pressing form or pad 44 that is carried by a portion of the standard 22 which overhangs the jack and which is forced downwardly to supply pressure to the sole; and a nail driving mechanism 46 that is also supported on the standard 22 and by means of which nails are driven to permanently secure the heel seat end of the sole to the shoe.

Figures 4, 5:
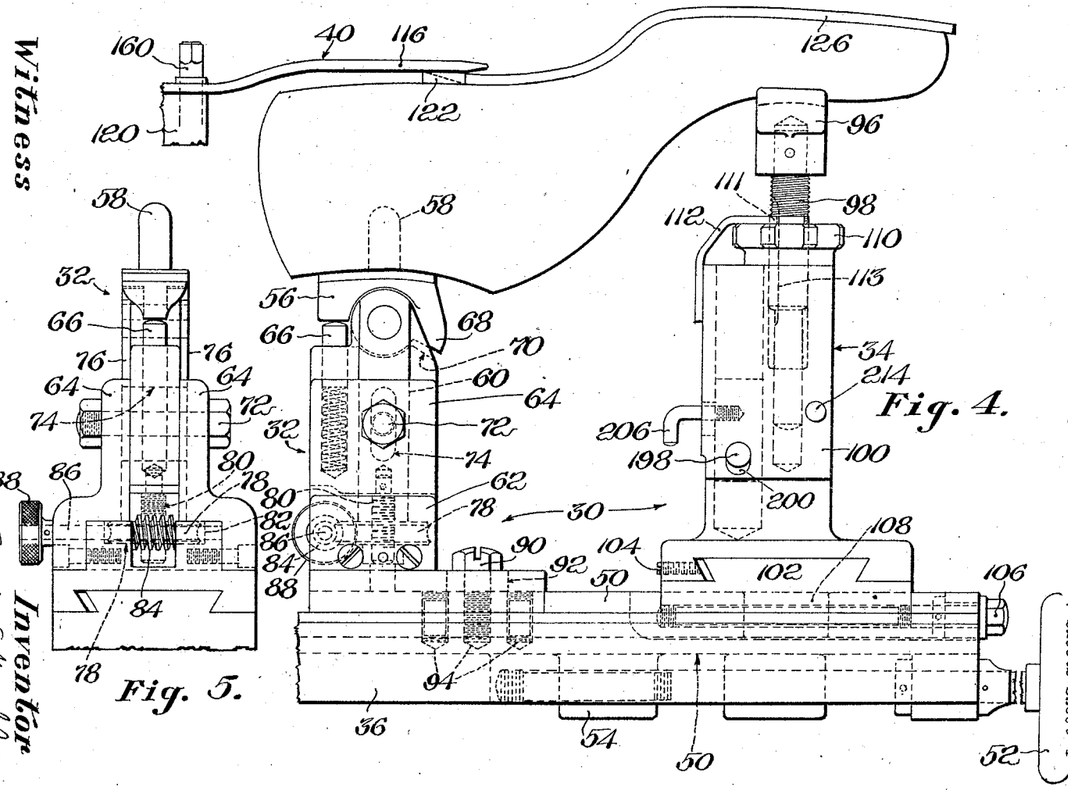
Fig. 4 is a view in side elevation and on a still larger scale showing the jack with a shoe placed thereon.
Fig. 5 is a view in side elevation of the mechanism shown in Fig. 4 looking from the left.

The heel and toe supports 32 and 34 (Figs. 1 and 4) are both mounted upon a bed plate 50 which constitute a portion of the jack and is dovetailed in the top of the jack-carrier 36 for longitudinal movement thereon to permit the shoe to be adjusted forwardly or rearwardly in the machine. This movement of the bed plate is effected by the manipulation of a hand screw 52 which is mounted to turn without longitudinal movement in the carrier and is threaded into a lug 54 depending from the bed plate 50.

The heel support 32 (Figs. 4 and 5) comprises a block 56 having a spindle 58 which enters the last on which the shoe to be operated upon is placed, a post 60 to which the block 56 is pivoted and a base 62 having uprights 64 rising therefrom between which the post 60 is rigidly but adjustably supported. The pivoted block 56 is acted upon by a spring pressed plunger 66 in the post 60 which tends to tilt the block in a direction bringing a stop block 68 projecting therefrom into engagement with a shoulder 70 on the post 60. The post 60 is secured in adjusted position by means of a clamping bolt 72 which extends through a slot 74 in the post and through the uprights 64. The slot 74 permits upward and downward adjustment of the post 60 between the uprights 64 when the clamping bolt 72 is loosened, and the post is at all times guided by means of ribs 76 formed thereon which are received in grooves in the uprights 64. The adjustment of the post 60 is effected by the turning of a nut 78 on a screw 80 which is secured to the lower end of the post 60, the nut being prevented from moving longitudinally with the screw by reason of its confinement in a recess 82 (Fig. 5) in the base 62. In order that the nut 78 may be conveniently operated, worm gear teeth which are formed upon its periphery are engaged by the teeth of a worm 84, the worm being secured to a shaft 86 that is journaled in the base 62 and provided with a knurled head 88 by which it may be manipulated. The base 62 is dovetailed onto the bed plate 50 of the carrier 36 for adjustment toward and from the toe post 34 and is secured in adjusted position on the bed plate by means of a screw 90 extending through a slot 92 in the base 62 and through one or another of a plurality of tapped holes 94 in the bed plate.

Figures 8, 9, 10:
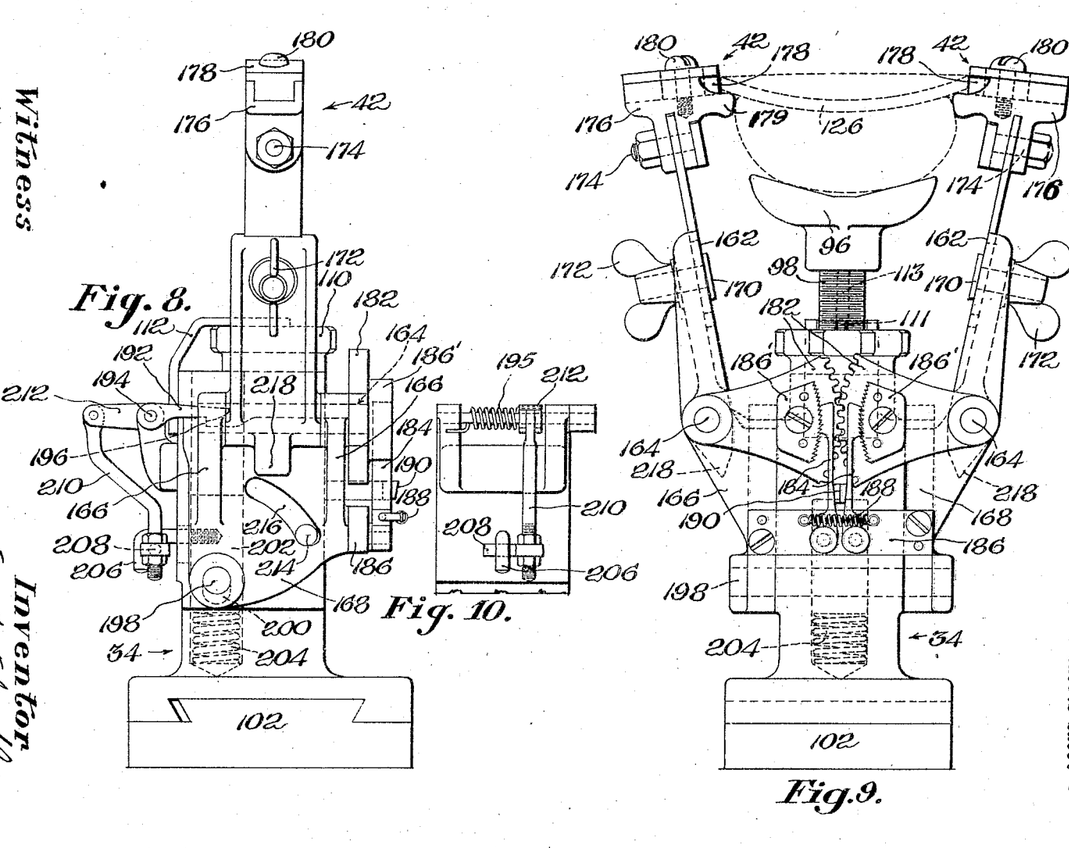
Fig. 8 is a view in side elevation of the locating or centering device for the forepart of the shoe.
Fig. 9 is a view in end elevation of said locating device.
Fig. 10 is a detailed view of a portion of the mechanism shown in Fig. 8 looking from the left.

The toe support 34 (Fig. 4) comprises a toe rest 96, a post 98 to the top of which the toe rest is secured, and a standard 100 in which the post 98 is adjustably supported. The standard 100 is dovetailed at its base upon a plate 102 in order that the toe support 34 may be adjusted transversely of the carrier 36, while the plate 102 is in turn dovetailed onto the bed plate 50 of the carrier to permit adjustment of the toe rest longitudinally with respect to the carrier. The adjustment of the toe rest upon the plate 102 is permitted by loosening one or more set screws 104 which normally serve to hold the standard 100 in adjusted position. The adjustment of the plate 102 longitudinally of the bed plate 50 is effected by an adjusting screw 106 that is mounted to turn without longitudinal movement on the bed plate and is threaded into a lug 108 depending from the plate 102. The post 98 is screw-threaded throughout a portion of its length and is provided with a hand actuated nut 110 by means of which the post and the toe rest 96 may be raised or lowered to adjust the longitudinal angular position of the shoe. The nut 110 is prevented from moving longitudinally on the post 98 by reason of its confinement between the top of the standard 100 and the under side of a retaining finger 112 which is secured to the standard and engages the top of the nut 110. The post 98 is prevented from turning with the nut by means of a projection 111 (Figs. 4 and 9) on the finger 112 which enters a longitudinal groove 113 in the post.

During the operation of the machine the jack-carrier 36 is supported with the bed-plate 50 in a substantially horizontal position and with the shoe located directly beneath the sole pressing form 44. In order that the jack-carrier may be swung out from beneath the pressure-form to permit removal from the jack of a shoe which has been operated upon and the placing of another shoe on the jack, the jack-carrier 36 is pivotally mounted on studs 114 which project from the head 38 and extend through the opposite sides of the carrier. The pivot studs 114 are so located with respect to the center of gravity of the jack-carrier that the latter may be swung by gravity into the position shown in Fig. 3 wherein the jack is conveniently located for the removal or reception of a shoe. After the shoe upon which a sole has been laid has been removed from the jack another shoe is placed thereon which is ready to receive an outsole. The sole is then located on the shoe with the aid of the locating devices 40 and 42 which will presently be described. After the sole has been located on the shoe the jack-carrier 36 is tilted upwardly to bring the shoe beneath the pressure-form 44, and said carrier is latched in this position upon the head 38. The head 38 is then raised, bringing the carrier and the shoe into the position shown in Fig. 1, wherein the sole of the shoe is ready to receive pressure from the form or pad 44.

Figure 6:
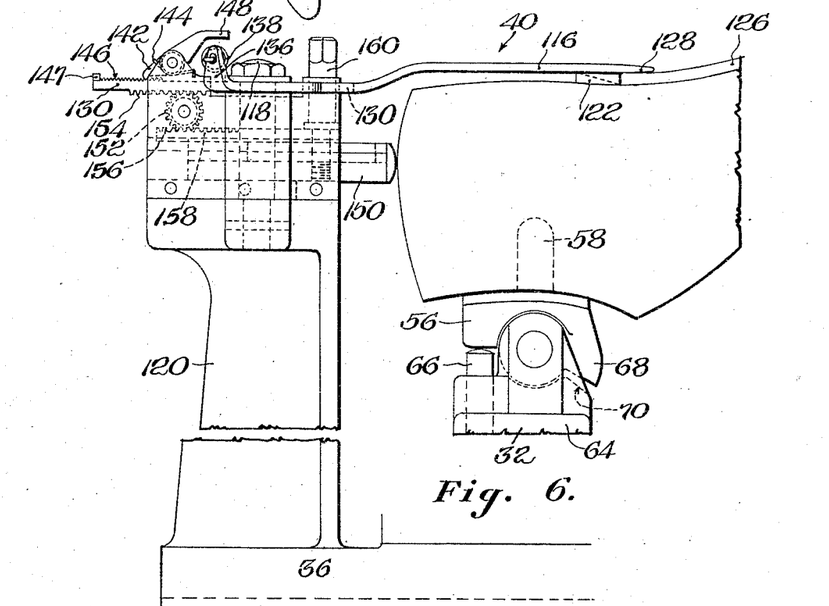
Fig. 6 is a view in side elevation of the gaging device for positioning the heel seat end of the sole.

The gaging device 40 (Figs. 6 and 7) for locating the heel seat end of the sole comprises a pair of forwardly extending gage-members or positioning arms 116 which are severally pivoted for horizontally swinging movement about studs 118 that are secured in an upright 120 rising from the jack-carrier 36. The positioning arms 116 are severally provided on their under sides, near the free ends thereof, with gage-blocks or abutments 122 having curved positioning faces 124 that are adapted to engage correspondingly shaped edge faces at the rear of the sole 126. A full description of the sole herein illustrated will be found in the United States Letters Patent No. 1,396,801, issued Nov. 15, 1921 on my application. The extremities of the arms 116 are adapted to overlap the outer face of the sole to assist in retaining the sole in adjusted position and are slightly bevelled at 128 to facilitate the positioning of the sole against the gage blocks 122. The arms 116 are connected to move in unison by means of a slide 130 that is supported and guided in the top of the upright 120 and is provided with rack teeth 132 at its opposite longitudinal edges which intermesh with segmental gear teeth 134 that are formed on each of the arms 116. Rearward extensions 136 of the arms 116 are connected by a spring 138 tending to force the free ends of the arms outwardly and away from the shoe. Handles 140 are formed on the arms 116 by means of which the arms may be swung inwardly into operative or sole engaging position, and means is provided for retaining the arms against the tension of the spring 138 in the position into which they are moved. The retaining means consists of pawl 142 which is pivoted at the top of the upright 120 and is forced downwardly by a spring 144 into engagement with ratchet teeth 146 on the upper side of the slide 130. The pawl 142 is upwardly extended to provide a releasing finger 148 which when depressed will swing the pawl out of engagement with the ratchet teeth in the slide 130 and restore the arms 116 to inoperative positions. The engagement of the pawl 142 with a stop lug 147 at the rear end of the slide 130 limits the outward movement of the arms 116 and determines their inoperative positions. The concurrent movement of the arms 116 toward each other is limited by the engagement with the rear of the shoe of a gage member 150 which is operatively connected with the arms 116 so as to be moved toward the shoe as the arms are swung inwardly. The gage member 150 is supported and guided for horizontal sliding movement in the upright 120 and is connected with the slide 130 so as to be moved in an opposite direction thereby. The connection between the slide and the gage member 150 comprises a pinion 152 that is rotatably mounted in the upright 120 and so arranged that its teeth mesh with rack teeth 154 on the under face of the slide 130 and with rack teeth 156 on the upper face of a plate 158 which is secured to the gage member 150 by means of a bolt 160 extending through a longitudinal slot in the plate 158. The head of the bolt 160 projects upwardly through a slot in the slide 130 so that it may be conveniently engaged by a wrench and loosened to permit relative adjustment of the plate 158 and the gage member 150. In this way the operative position of the arms 116 with relation to the medial line of the shoe may be varied in accordance with shoes of different sizes and styles without varying the operative positions of the arms 116 relatively to the rear end of the shoe. The latter relation, which determines the longitudinal location of the rear extremity of the sole, is obtained by releasing the gage member 150 relatively to the plate, shifting the jack 30 toward the upright 120 to bring the shoe into proper relation to the arms 116, and then adjusting the gage member 150 in the plate 158 to correspond.

In order to adjust the gaging device 40 for a shoe of a given style or size, the shoe is first placed upon the jack and the sole is manually located in proper position on the shoe. The jack is then adjusted on the carrier 36 and the arms 116 are swung inwardly toward the shoe until the positioning faces 124 of the blocks 122 are brought into engagement with the corresponding edge faces of the sole. With the arms 116 held in their adjusted positions by the engagement of the pawl 142 with the ratchet teeth 146, the gage member 150 is brought forward into contact with the rear of the shoe, the screw 160 having been previously loosened to permit relative movement between the gage 150 and the plate 158. After the pawl 142 has been released to permit the arms 116 and the gage member 150 to return to their normal or inoperative positions, the gaging device is in readiness for operation.

Figure 7:
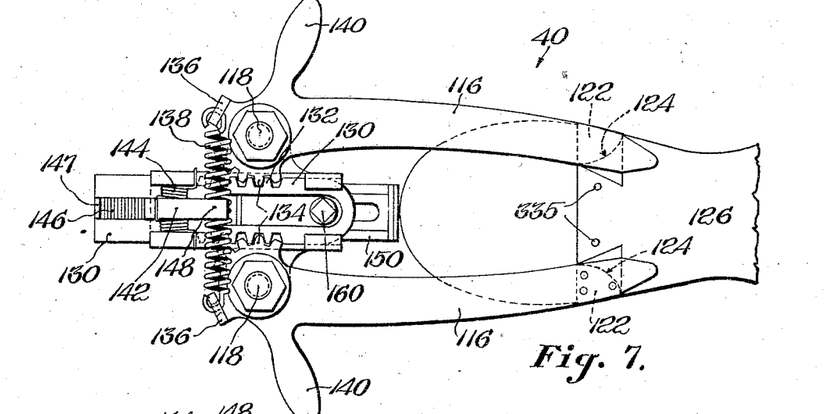
Fig. 7 is a top plan view of mechanism shown in Fig. 6.

The gaging device 40 having been properly adjusted, a shoe upon which an outsole is to be laid is placed on the jack and after the jack has been swung upwardly to bring the shoe into position to be operated upon, the positioning arms 116 are swung toward each other, by means of the handles 140 until the gage member 150 comes into contact with the rear of the shoe. The arms 116 are then in operative position, as shown in Fig. 7, and the operator places the sole on the shoe, inserting the shank end thereof beneath the bevelled extremities of the arms 116 and forcing the curved edge portions of the shank end of the sole against the curved positioning faces 124 whereby the rear of the sole is located both longitudinally and laterally with respect to the shoe.

After the sole has been placed upon the shoe and its heel-seat end has been located by the gaging device 40, the locating device 42 is operated to position the forepart of the sole upon the shoe. The locating device 42 (Figs. 8, 9 and 10) comprises a pair of upright arms 162 which are vertically movable toward and from the sides of the shoe. To this end the arms 162 are secured at their lower ends upon rock shafts 164. Each rock shaft 164 is journaled in bearing lugs 166 projecting from a gage carrier 168 which is mounted upon the toe support 34 and is movable thereon to move the arms 162 downwardly away from the shoe so that the shoe may be swung laterally off from the toe rest 96 before it is removed from the spindle 58. The arms 162 each comprise upper and lower members which are secured together by a bolt 170 and wing nut 172, the bolt extending through a longitudinal slot in the upper member of the arm and thereby permitting relative adjustment of the arm members to lengthen or shorten the arm. Adjustably but rigidly secured by means of a bolt 174 to the top of each arm 162 is a gage block 176 which carries relatively adjustable gages 178 and 179 for engaging the lateral edge of the forepart of the sole and of the upper respectively. Each gage 178 is guided in the gage block 176 for movement toward and from the side of the shoe and is secured in position by means of a screw 180 extending through a slot in the gage. It is often desirable to have the forepart of the sole project slightly more at one side of the shoe than at the opposite side and the desired unequal projection of the sole may be secured by the adjustment of the gages 178 on the gage blocks 176. By loosening the nut on the bolt 174, the gage block may be adjusted angularly to bring the gage into alignment with the plane of the sole.

Figure 1:
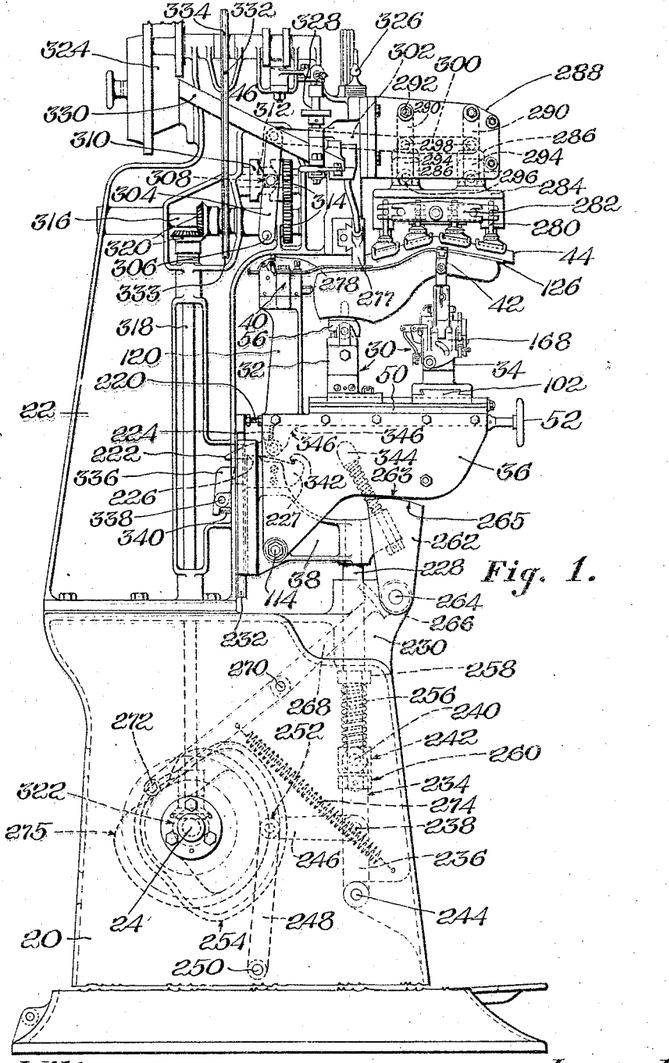
Figure 1 is a view in side elevation of the machine.

In order that the arms 162 may be operated to effect the positioning of the forepart of the sole on the shoe, the arms are connected to move in unison toward and from the opposite sides of the shoe by means of intermeshing segmental gears 182 which are secured to the rock shafts 164. In positioning the sole, the arms 162 are swung manually toward the shoe and are locked in sole engaging position by means of one or the other of the two upright spring fingers 184 which are pivoted at their lower ends on a cross bar 186 connecting the opposite sides of the carrier 168, the upper ends of each finger being provided with ratchet teeth which are adapted to engage similar teeth formed on a ratchet segment 186' that is secured to the side of the corresponding segmental gear 182. These fingers 184 are connected by a spring 188 tending to swing them toward each other and out of operative engagement with their respective ratchet segments. When the centering gages 42 are in working relation with the sole, as indicated in Fig. 1, the spring fingers 184 are held against the ratchet segments 186 by means of a wedge 190 which projects from the standard 100 between the fingers 184 holding them apart against the tension of the spring 188. The ratchet teeth on the fingers 184 are so arranged relatively to their respective ratchet segments 186' that when the teeth of one of the fingers are in holding engagement with the teeth of the cooperating ratchet segment, the ratchet teeth of the opposite finger are disposed with their holding faces located midway between the top and bottom of the inclined faces of the cooperating ratchet segment. In this way a very fine adjustment of the centering gages may be secured.

The operation of locating the sole with the aid of the devices described may be performed with facility and despatch by a relatively unskilled workman. The use of the gaging device for the heel seat end of the sole insures the locating thereof in exactly the required position so that when the heel is fitted to the heel-seat it will be properly located with respect to the shoe. By means of the centering device the forepart of the sole is accurately centered upon the shoe without the necessity of the exercise of extreme care and precaution upon the part of the operator that is required when soles are fitted in the ordinary manner. Moreover the soles may be cut very closely to the size ultimately desired inasmuch as it is not necessary to make allowance for improperly locating the soles and consequently there is very little material wasted when subsequently trimming the edges of the soles.

The positioning gages for the forepart of the shoe are arranged to be released from sole engaging position by a pressure of the form 44, after they have performed their locating function, in order that they may be swung out of working relation with the sole into a position where they will not interfere with the removal of the shoe from the jack and the placing of another shoe thereon. To this end, the gage arms 162 are mounted upon the gage carrier 168 so as to be movable in a vertical plane at right angles to the plane of oscillation of the gage arms 162 and means is provided for latching the carrier in operative position and for automatically tripping the latching means upon the application of pressure to the sole by the form 44. The carrier 168 is held in operative position by means of a latch 192 that is secured to a stud 194 which is free to turn in bearings at the rear of the standard 100, and a spring 195, surrounding the stud 194, tends to hold the latch in position to engage a shoulder 196 on the top of the carrier 168. The pivotal connections between the gage carrier 168 and the standard 100 are arranged at the rear of the center of gravity of the carrier so that the carrier will drop by gravity into inoperative position when the latch is tripped. This connection comprises a stud 198 which supports on its extremities the carrier 168, the stud extending through slots 200 in the sides of the standard 100 and through a plunger 202 that is located in a recess in the standard 100 and is pressed upwardly by a stiff spring 204 so that the stud is normally forced against the upper ends of the slots 200. With an arrangement of this sort, the gage carrier 168 and the arms 162 are permitted to yield downwardly a small amount when engaged by the pressure form 44, and in order that this slight downward movement may be utilized to trip the latch 192, the plunger 202 is operatively connected with the latch in the following manner. A hook 206 which projects from the rear of the plunger 202 through a slot in the standard 100, engages a pin 208 projecting laterally from a link 210 which is pivotally secured to an arm 212 that is fixed to the stud 194. By means of this construction, not only is the shoulder 196 depressed relatively to the latch 192 when the gage-carrier 168 is forced downwardly, but the latch 192 is lifted an amount equal to the downward movement of the shoulder, so that the unlatching of the carrier is effectively accomplished. The downward tilting movement of the carrier is limited by the engagement of pins 214 projecting from opposite sides of the standard 100 with the upper end of the arcuate slots 216 in the opposite sides of the carrier, into which the pins extend. As the gage-carrier tilts forwardly after being released from operative position, the spring fingers 184 are moved away from the wedge 190 which is mounted on the stationary standard 100 and the spring 188 swings them out of engagement with the ratchet segments 186 thus permitting the arms 162 to swing backwardly from the sides of the shoe by gravity until their movement is arrested by the engagement of downward extensions 218 of the arms with the sides of the gage-carrier 168. After another shoe has been placed on the jack, the gaging device is lifted into working relation with the shoe and its movement in this direction is limited by the engagement of the pins 214 with the bottom ends of the slots 216.

After a short outsole has been properly positioned on the shoe with the aid of the locating devices 40 and 42, the jack carrier 36 is swung upwardly about its pivots 114 to bring the sole directly beneath the pressure form 44, this position being determined by the engagement of an adjustable stop screw 220 with the front of the frame standard 22. The jack carrier is held in this position by means of a latch 222 (Figs. 1 and 3) which is maintained by means of a spring 224 in engagement with a shoulder 226 formed on a plate 227 that is secured to the head 38. In order that the shoe may be raised into position to be operated upon, the head 38 upon which the jack carrier is mounted is secured to the top of a shaft 228 which is guided to reciprocate vertically in a bearing 230 in the base 20. The head 38 reciprocates in sliding engagement with the main standard 22, a vertical guiding rib 232 on the standard 22 being received in a groove in the head and serving to prevent the head from turning. The head is actuated to raise the shoe into position for the application of pressure to the sole and the driving of the nails into the heel seat end thereof, and to lower the shoe after the sole has been laid, by means of a toggle comprising a pair of links 234 constituting one arm of the toggle and a link 236 constituting the other arm of the toggle, the arms being pivoted together at 238. The upper ends of the links 234 are pivoted at 240 on the opposite sides of a sleeve 242 that is loosely mounted on the shaft 228 while the lower end of the link 236 is pivoted at 244 to a bracket on the base 20. The knuckle joint 238 of the toggle is connected by a pair of links 246 to a cam lever 248 which is pivotally mounted on a stud 250 in the base 20 and is provided with a cam roll 252 which enters a groove in a cam 254 on the main shaft 24. As the toggle is straightened, the head 38 is yieldingly raised through a coiled spring 256 which encircles the shaft 228 between the sleeve 242 and a collar 258 that is positioned beneath a shoulder on the shaft. As the toggle is being broken, the downward movement of the sleeve 242 is transmitted to the shaft 228 through a collar 260 fixed to the lower end of the shaft.

When the main shaft 24 is connected through its clutch 28 with the drive pulley 26, the cam 254 operates to raise the shoe into position to be operated upon. In order that the shoe may be rigidly supported for the sole pressing and nail driving operations, a pair of supports 262 are oscillated into position beneath the lower edge faces 263 of the sides of the jack carrier 36. These supports 262 are secured to a rock shaft 264 and are each provided with a circular wedge face 265, eccentric to the axis of the shaft 264, which swings into wedging contact with the faces 263 of the jack carrier. The rock shaft 264 is journaled in a portion of the bearing 230 and secured to the rock shaft is a pinion 266, the teeth of which intermesh with segmental gear teeth formed on a cam lever 268, the lever being fulcrumed at 270 on the base 20 and carrying a cam roll 272 which is held by a spring 274 against the periphery of a cam 275 which is fast on the hub 276 of the rotatably mounted clutch member 28.

When the shoe is in position to be operated upon, the heel seat end of the short outsole is engaged and firmly held in place against the shoe by means of the lower extremities of two nail throats 277 of the nail driving mechanism 46, the shoe being forced upwardly against the throats by the spring 256. Just as the sole comes into engagement with the nail throats, the gage arms 116 are released from operative position and are moved outwardly by the spring 138 so that they will not interfere with the application of pressure to the sole by the pressing form 44. The release of the arms 116 is effected at the end of the upward movement of the jack carrier by the engagement with the releasing finger 148 on the pawl 142 of an adjustable abutment 278 (Fig. 1) depending from the forwardly extending portion of the frame standard 22. The sole is now held in position on the shoe by the engagement therewith of the nail throats 277 and the locating devices 42 and is ready to be acted upon by the pressing form 44.

The pressing form 44 comprises a continuous elastic pad that is suspended from a plurality of separate hangers 280 which support the pad at intervals throughout its length and are connected by pressure distributing or equalizing mechanism 282 with a movable carrier 284. The pressure pad with its supports and pressure distributing mechanism is similar in construction and mode of operation to that of corresponding parts illustrated and described in Patent No. 694,367, granted March 4, 1902 to G. H. Gifford, and is adapted to automatically adjust itself to operate effectively upon shoes of different sizes.

The carrier 284 for the pressing form or pad 44 is movable vertically and to this end is provided with upwardly extending arms 286 which are guided in ways formed in a bracket 288 projecting forwardly from the standard 22. The carrier 284 is suspended from and actuated by a pair of toggles each consisting of a link 290 which is pivotally connected at 292 with the bracket 288 and which constitutes one arm of the toggle, and a pair of links 294 which are pivotally connected at 296 with the carrier 284 and which constitute the other arm of the toggle, the two arms being connected by pivot studs 298 and the pivot studs 298 being connected by a link 300. The rearmost of the pivot studs 298 is connected by a link 302 with the upper end of a cam lever 304. The cam lever 304 is fulcrumed at 306 on the frame standard 22 and carries a cam roll 308 which enters a groove in a cam 310, the cam being secured to a shaft 312 that is journaled in suitable bearings on the standard 22. The cam 310 is driven through intermeshing spur gears 314, one fixed to the shaft 312 and the other to a countershaft 316 that is also journaled in bearings on the standard 22. The countershaft 316 is driven from a vertical shaft 318 through intermeshing bevel gears 320. The vertical shaft 318, which is journaled in bearings on the standard 22, is in turn driven from the main shaft 24 through intermeshing bevel gears 322.

In the construction shown, the nail driving mechanism 46 is provided for driving nails or tacks to secure the heel seat end of the sole to the shoe. This mechanism is similar to that disclosed in Patent No. 1,106,393, granted August 9, 1914 to F. L. MacKenzie, except that the present mechanism is adapted to drive two nails simultaneously. To this end a single hopper 324 and duplicate sets of devices are provided, one set arranged on each side of the standard 22 and including a driver 326 which operates in one of the nail throats 277, a separator 328 which delivers tacks to the driver and a race way 330 which supplies tacks to the separator. The tack driving mechanism is driven by means of a sprocket-chain 332 which passes over a sprocket-wheel 333 on the shaft 316 and a similar sprocket-wheel 334 on the main shaft of the tack-driving mechanism. This mechanism is adapted to drive two tacks through the heel seat end of the outsole substantially in the positions indicated at 335 in Fig. 7. The tacks 335 project through the insole against the inner face of which they are clenched by contact with the last in the shoe.

Figure 3:
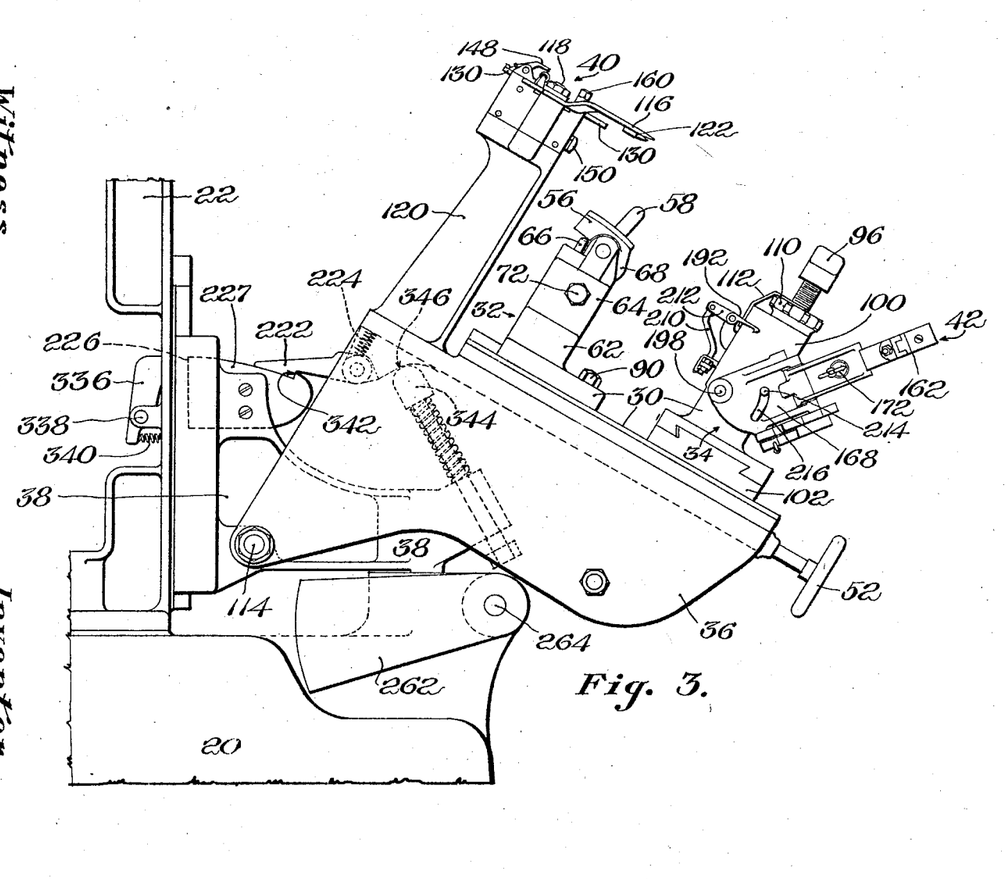
Fig. 3 is a view of a portion of Fig. 1 on an enlarged scale showing a different position of the carrier upon which the shoe supporting jack and the sole locating devices are mounted.

Before the cycle of operations of the machine is completed the pressure pad 44 is raised and the head 38 is lowered, each to their initial inoperative positions, the supports 262 having been first oscillated out of supporting engagement with the jack carrier 36. As the head 38 moves downwardly, the latch 222 is disengaged from the shoulder 226 by a trip device comprising a pawl 336 that is pivoted at 338 on the frame standard 22 and is normally held in the path of the latch 222 by a spring 340. The pawl 336 is so arranged that when the head 38 is in its lowermost position and the jack-carrier is swung upwardly thereon, the pawl will yield rearwardly under the horizontal pressure of the latch 222 to permit the latch 222 to engage the shoulder 226 on the plate 227. When the head 38 rises, the pawl 336 slips under the end of the latch, and when the head descends again the latch is forced upward from the shoulder 226 and the jack-carrier falls by gravity until said latch engages a shoulder 342 on the plate 227 as indicated in Fig. 3. The shock of the downward movement of the carrier 36 is absorbed by a cushioning device consisting of a spring pressed plunger 344 which is guided in the head 38 and engages a surface 346 on the under side of the jack-carrier.

Figure 11:
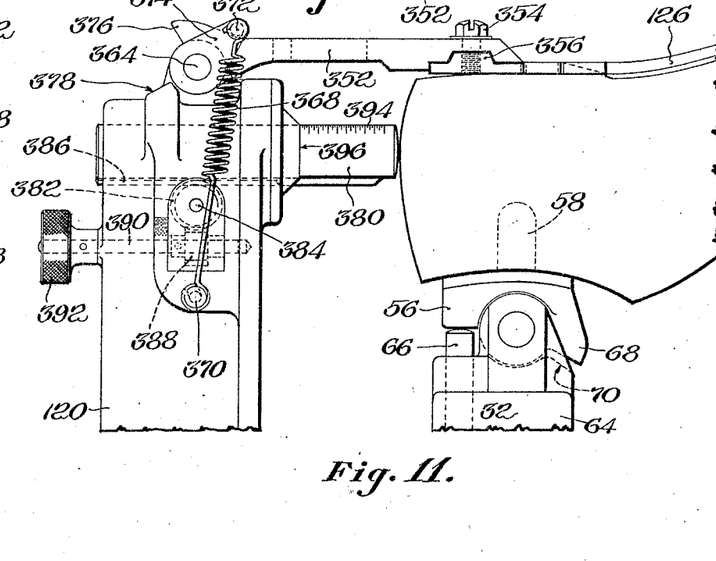
Figs. 11, 12 and 13 are respectively side, plan, and end views showing a modified form of the gaging device for the heel seat end of the sole.
Figure 12:
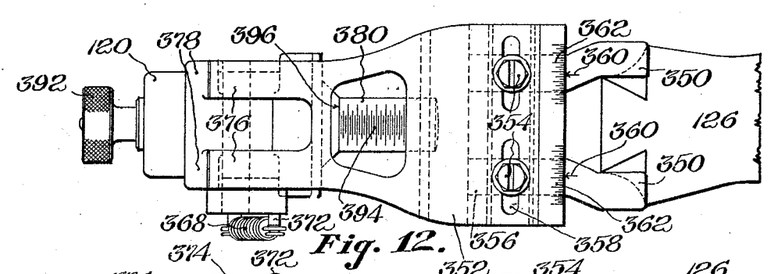
Figure 13:
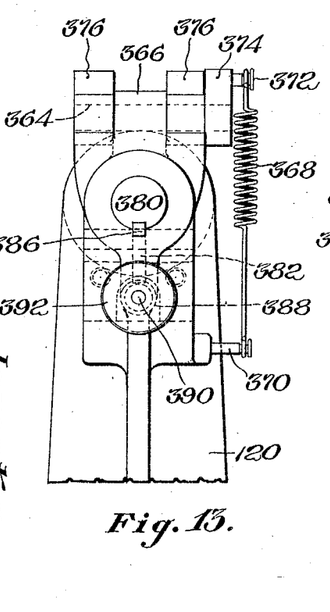

In Figs. 11, 12 and 13 is shown a modified form of locating device for the heel seat end of a short outsole in which graduations are provided for the purpose of determining the positions of the gage members for shoes of varying sizes and styles. In this construction a pair of spaced apart gage members 350 are provided for engaging the rear of the sole. These gage members 350 are carried by an arm 352, each member being secured to the arm by a bolt 354 and provided with a ridge 356 which enters a corresponding groove in the arm to prevent the gage member from turning on the bolt 354. The bolts 354 extend through slots 358 so arranged in the arm 352 that when the bolts are loosened, the gage members may be adjusted toward or from each other to adapt them for engagement with soles of different widths. The position of the gage members 350 for shoes of different sizes may be determined by the relation of a mark or pointer 360 on each of the gage members and a scale 362 on the arm 350 adjacent the pointer. The arm 352 is mounted on the upright 120 for vertical swinging movement so that the gage members 350 may be swung out of working relation with the sole before the shoe is removed from the jack. To this end the rear extremity of the arm 352 is bifurcated and secured to a stud 364 projecting from the upright 120 between the bifurcated ends of the arm 352. The arm with the gage members 350 is adapted to be swung into a substantially horizontal position for engagement with the sole and is held downwardly against the shoe by a coiled spring 368 one end of which is secured to a pin 370 on the upright 120 while its opposite end is secured to a pin 372 on an arm 374 secured to the stud 364. To permit removal of the shoe from the jack after the sole has been laid thereon, the arm 352 is swung upwardly and rearwardly in inoperative position, this position being determined by the engagement of a stop lug 376 on the arm 352 with a shoulder 378 on the upright 120. The position of the arm 374 on the stud 360 is such that the pin 370 on which the spring 368 is secured is located forward of the center of the stud 364, when the arm 352 is in operative position, and that said pin is located to the rear of the center of the stud 364 when the arm 352 is in inoperative position, so that the arm is held in both positions by the spring 368. The location of the rear end of the short outsole with respect to the rear of the shoe is determined by means of a cylindrical gage member 380 which is supported and guided on the upright 120 for horizontal sliding movement. In order that the gage member 380 may be conveniently adjusted toward and from the shoe to vary the longitudinal location of the gage members 350, adjusting means are provided comprising a worm wheel 382 that is rotatably mounted on a pin 384 in the upright 120, the teeth of the worm wheel meshing with rack teeth 386 at the bottom of the sliding gage member 380. The worm wheel 382 is rotated by a worm 388 on a shaft 390 that is mounted to turn in bearings in the upright 120. The shaft 390 is adapted to be rotated by means of a knurled head 392. The position of the gaging member 380 may be determined by the relation of the divisions of a scale 394 with the adjacent bevelled edges 396 of the bearing in the upright 120 in which the gage is adapted to slide. After the required adjustment of the sliding gage member 380, the jack is moved to bring the rear of the shoe against the gage member.

It will be understood that the specific construction and arrangement of parts shown and described is not essential and may be changed or modified without departing from the broader features of the invention as defined in the appended claims.

The invention having been described, what is claimed is:—

1. A machine for use in the manufacture of shoes provided with short outsoles having a surface formed on the outsole as a permanent part of the rear end surface at the heel seat end thereof, having, in combination, a shoe supporting jack, and a gaging device constructed and arranged to determine the position of the sole in its own plane in a predetermined relation to a shoe supported by the jack by engagement with the said permanent surface.

2. A machine for use in the manufacture of shoes provided with short outsoles having a surface formed on the outsole as a permanent part of the rear end surface at the heel seat end thereof, having, in combination, a shoe supporting jack, a gaging device constructed and arranged to fit the said permanent surface to located the sole in its own plane relatively to the shoe supported by the jack by engagement with said permanent surface, and means for securing the sole to the shoe.

3. A machine for use in the manufacture of shoes provided with short outsoles having a concavity between a tongue and the main body at the heel seat end thereof, having, in combination, a shoe supporting jack, a gaging device having a lug constructed and arranged to enter the said concavity in the outsole of a shoe supported on the jack to locate the sole in its own plane relatively to the shoe, and a nailing device for securing the sole to the shoe.

4. A machine for use in the manufacture of shoes provided with short outsoles having a reentrant angle at their heel ends as a permanent characteristic thereof, having, in combination, a shoe supporting jack, and a gaging device having an abutment arranged to enter the said reentrant angle of the sole of a shoe on the jack to gage the sole to a predetermined relation with the shoe.

5. A machine for use in the manufacture of shoes having short outsoles having, in combination, a shoe supporting jack, a gaging device for engaging the heel-seat end of a short outsole as the latter is applied to a shoe supported by the jack to locate the sole relatively to the shoe, a pressure applying pad for laying the sole, and a nailing device for securing the sole to the shoe.

6. A machine for use in the manufacture of shoes provided with short outsoles having a concave surface, terminating at angular ends, formed therein between the main body and a tongue at each side of the heel end thereof as a permanent part of the sole, having, in combination, a shoe supporting jack, a gaging device having fingers arranged to contact with and extend between said angular ends on each side of the sole respectively and to exert pressure longitudinally and laterally of the sole to gage it into a predetermined relation to a shoe on the jack, and means for positioning the forepart of the sole relatively to the shoe.

7. A machine for use in the manufacture of shoes having short outsoles having, in combination, a shoe supporting jack, a gaging device for positioning the heel-seat end of a short outsole relatively to the shoe supported by the jack, and means for automatically moving said device out of operative relation with the sole after it has performed its positioning function in order to facilitate the removal of the shoe from the jack.

8. A machine for use in the manufacture of shoes having, in combination, a shoe supporting jack, means for positioning the sole relatively to the shoe supported by the jack, and means for automatically moving said sole positioning means out of operative relation with the sole after it has performed its positioning function in order to facilitate the removal of the shoe from the jack.

9. A machine for use in the manufacture of shoes having short outsoles having, in combination, a shoe supporting jack, a gaging device adapted to be swung into operative position to locate the heel-seat end of a short outsole upon the shoe, a pressure applying form for laying the sole upon the shoe, and means for automatically moving the gaging device out of operative relation with the sole before the performance of the sole laying operation.

10. A machine for use in the manufacture of shoes having, in combination, a shoe supporting jack, a plurality of positioning members movable relatively to the jack into position for engagement with the sole, means for latching said members in operative position, and means for releasing said latching means.

11. A machine for use in the manufacture of shoes having short outsoles each of which is provided with a tongue at its rear extremity, having, in combination, a shoe supporting jack, and a gaging device including a pair of positioning arms connected to move in unison into position for wedging engagement between the rear extremity of a short outsole and a tongue thereon at the opposite lateral edges thereof to located the sole in its own plane relatively to the shoe.

12. A machine for use in the manufacture of shoes having short outsoles having, in combination, a shoe supporting jack, a gaging device including a pair of normally inoperatively positioned arms adapted to be moved toward each other into position for engagement with the heel seat portion of a short outsole to position it upon the shoe, means for locking the arms in operative position, and means for automatically releasing the arms.

13. A machine for use in the manufacture of shoes having short outsoles having, in combination, a sole-pressing form, a shoe supporting jack, a gaging device for locating the heel-seat end of the sole relatively to the shoe, means for temporarily holding the sole against the shoe after the heel-seat end has been located, means adapted to operate upon the engagement of said holding means with the sole to cause the gaging device to be withdrawn from operative relation with the shoe, and means for actuating the form to supply pressure to the sole.

14. A machine for use in the manufacture of shoes having short outsoles having, in combination, a sole-pressing form, a shoe supporting jack, means for relatively actuating the form and the jack to secure pressure on the sole, a pair of positioning arms connected to be moved in unison and adapted to be moved toward each other into position to engage the edge of the sole at the heel-seat end thereof, and a gaging member adapted to be moved into engagement with the shoe as said arms are moved toward each other for the purpose of determining the operative position of the arms.

15. A machine for use in the manufacture of shoes having short outsoles having, in combination, a sole-pressing form, a shoe supporting jack adapted to be moved so as to bring the shoe into position to receive the pressure of the form, a gaging device for locating the sole upon the shoe supported by the jack, means for actuating the form to supply pressure to the sole of the shoe, and means for driving a tack through the heel-seat portion of the sole to secure it in adjusted position on the shoe.

16. A machine for use in the manufacture of shoes shaving, in combination, a sole-pressing form, a shoe supporting jack, gaging devices for locating a sole upon the shoe, and means for causing the automatic withdrawal of the gaging devices from working relation with the sole before the application of pressure to the sole by means of the form.

17. A machine for use in the manufacture of shoes having, in combination, a sole-pressing form, a shoe supporting jack, gaging members adapted to be moved into operative position for locating the sole on the last, means for latching the gaging members in operative position, means for relatively actuating the form and the jack to secure pressure upon the sole of the shoe, and means rendered operative by said relative movement for unlatching the gaging members to permit their withdrawal from operative relation with the shoe.

18. A machine for use in the manufacture of shoes having, in combination, a sole-pressing form, a shoe supporting jack adapted to be moved so as to bring the shoe into position to receive the pressure of the form, a gaging device for locating the sole upon the shoe supported by the jack, means for actuating the form to supply pressure to the sole of the shoe, and mechanism for causing the jack to be moved so as to withdraw the shoe from the plane of movement of the form.

19. A machine for use in the manufacture of shoes having, in combination, a reciprocable sole-pressing form, a shoe supporting jack adapted for oscillatory and reciprocating movement, to permit the jack to be swung into position with the sole of the shoe in parallelism with the form and then moved toward the form to bring it into position to be operated upon, means for actuating the form to supply pressure to the sole, and means for causing the jack to be swung out of its operative relation to the form to facilitate the removal of the shoe from the jack and the placing of a new shoe thereon.

20. A machine for use in the manufacture of shoes having, in combination, a sole-pressing form, a reciprocable head, a shoe supporting jack mounted upon the head and adapted to be swung relatively thereto to position the shoe with the sole in parallelism with the form, means for latching the jack to the head to maintain the shoe in said relationship to the form, means for reciprocating the head to move the shoe to and from position to be operated upon, means for actuating the form to supply pressure to the sole, and means for unlatching the jack from the head to permit the shoe to be swung out of its working relation with the form.

21. A machine for use in the manufacture of shoes having, in combination, a sole-pressing form, a reciprocable head, a shoe supporting jack mounted upon the head and adapted to be swung relatively thereto to position the shoe with the sole in parallelism with the form, means for latching the jack to the head to maintain the shoe in said relationship to the form, means for reciprocating the head to move the shoe to and from position to be operated upon, means for actuating the form to supply pressure to the sole, means for unlatching the jack from the head to permit the jack to be swung downwardly by gravity out of its working relation with the form, and means for cushioning the downward movement of the jack.

22. A machine for use in the manufacture of shoes having, in combination, a sole-pressing form, a shoe-supporting jack adapted to move the shoe into and away from position to be operated upon by the form, a gaging device for locating the sole on the shoe, means for holding the sole against the shoe when the shoe is in position to be operated upon, means acting upon the shoe to hold the sole yieldingly against said holding means, means for causing the gaging device to be moved out of operative engagement with the sole upon the engagement of the sole with said holding means, and means for actuating the form to apply pressure to the sole.

23. A machine for use in the manufacture of shoes having, in combination, a sole-pressing form, a shoe supporting jack adapted to move the shoe toward and from position to receive pressure from the form, a gaging device adapted to be moved into position to locate an outsole when the shoe is out of working relation with the form, means for locking the gaging device in operative position, means for temporarily holding the sole in its adjusted position when the shoe is brought into position to be operated upon, means for unlocking the gaging device upon the engagement with the sole of said holding device, means for withdrawing the gaging device from operative relation with the sole, and means for actuating the form to apply pressure to the sole.

24. A machine for use in the manufacture of shoes having short outsoles provided with a projecting tongue at the heel seat end thereof having, in combination, a shoe supporting jack, and gages for engaging the opposite lateral angles between said tongue and the main body of the outsole to locate the tongue in its own plane relatively to the shoe.

25. A machine for use in the manufacture of shoes having, in combination, a sole-pressing form, means for actuating the form to apply pressure to the sole, a shoe-supporting jack normally positioned to support the shoe with its sole out of parallel relation with the form and constructed and arranged to be manually swung into position with the sole of the shoe in parallelism with the form, and means operating automatically after the jack has been thus positioned to vertically reciprocate the jack to move the shoe toward and from position to receive the pressure of the form.

26. A machine for use in the manufacture of shoes having, in combination, a normally retracted sole-pressing form, means for actuating the form to apply pressure to the sole, a shoe-supporting jack operable to move the shoe so as to bring its sole into position to receive the pressure of the form and to retract the sole from pressure-receiving position, a normally retracted gaging device for locating the sole on the shoe, and means for latching the gaging device in operative position adapted to be released by the operative movement of the form to permit the gaging device to be retracted to normal position.

27. A machine for use in the manufacture of shoes having, in combination, a sole-pressing form, a shoe-supporting jack, means for relatively actuating the form and the jack to secure pressure on the sole, an arm adapted to be moved into position to engage the edge of the sole to position the sole relatively to the shoe, and a gaging member connected with said arm for movement toward the shoe upper as said arm is moved toward the edge of the sole for the purpose of determining the operative position of said arm in accordance with the size of the shoe.

28. A machine for use in the manufacture of shoes having, in combination, a sole-pressing form, a shoe-supporting jack, means for relatively actuating the form and the jack to secure pressure on the sole, a pair of sole-positioning arms connected to move in unison toward and from each other and adapted to engage the opposite edges of the sole, a gaging member for engaging the shoe upper to determine the size of the shoe being operated upon and relatively positioning said arms in accordance therewith, said member being connected with said arms so as to move toward the shoe as the arms are moved toward each other and to move away from the shoe as said arms are spread apart, means for latching said arms and said gaging member in operative position, means for tripping said latching means prior to the application of pressure to the sole, and means for retracting said arms and gaging member from operative positions.

29. In a machine of the class described, a sole pressing form, a shoe supporting jack, means for relatively actuating the form and jack to secure pressure on the sole, a gaging device arranged to contact with the end of the sole, and a second gaging device arranged to contact with the corresponding end of the shoe, said devices being interconnected to move simultaneously to locate a sole in proper relation to a shoe on the jack.

30. In a machine of the class described, a sole pressing form, a shoe supporting jack, means for relatively actuating the form and jack to secure pressure on the sole, a gaging arm arranged to move laterally of the shoe to locate the end of the sole laterally on the shoe, and a second gaging device arranged to contact with the corresponding end of the shoe, said gaging devices being mechanically connected to move simultaneously to locate a sole in proper relation to a shoe on the jack.

31. A machine for use in the manufacture of shoes having short outsoles having, in combination, a sole-pressing form, a shoe supporting jack, means for relatively actuating the form and the jack to secure pressure on the sole, a pair of positioning arms connected to be moved in unison and adapted to be moved toward each other into position to engage sole positioning surfaces at the heel end thereof, and a gaging member geared to the arms and arranged to move toward and from the shoe as the arms move back and forth to locate the end of the shoe in definite relation to the ends of the arms, said connection between the gaging devices being adjustable to permit proper placing of the shoe end in connection with the particular positioning surfaces being used.

32. In a machine for relatively positioning soles and shoes, a gage constructed and arranged to exert a pressure on a sole in its plane, said pressure having components in both longitudinal and lateral directions in the plane of the sole, and a second gage, constructed and arranged to contact with the end of a shoe, said gages being interconnected to move dependently properly relatively to position the sole and the shoe.

33. In a machine for relatively positioning soles and shoes, a pair of gages constructed and arranged to move toward and from each other to engage surfaces on a sole lying at a substantial angle with the longitudinal and transverse directions of the sole to exert pressures on the sole having both longitudinal and lateral components in the plane of the sole, and a third gage constructed and arranged to engage the end of a shoe, and movable toward and from the shoe dependently with the movements of approach and separation of said pair of gages to relatively position the shoe and sole.

34. In a machine for relatively positioning soles and shoes, a pair of gages constructed and arranged to move toward and from each other to engage surfaces at the rear end of a short sole lying at a substantial angle with the longitudinal and transverse directions of the sole to exert pressures on the sole having both longitudinal and lateral components in the plane of the sole, and a third gage constructed and arranged to engage the end of a shoe, and movable toward and from the shoe dependently with the movements of approach and separation of said pair of gages to relatively position the shoe and sole.

35. In a machine of the class described, a shoe supporting jack, a gaging device arranged to contact with the rear end of a short sole, and a second gaging device arranged to contact with the corresponding end of the shoe, said devices being relatively adjustable in a direction parallel to the length of the shoe and being interconnected to move simultaneously to locate a sole in proper relation to a shoe on the jack.

36. In a machine of the class described, a shoe supporting jack, a gaging arm arranged to move laterally of the shoe to contact with and locate the end of a short sole laterally on the shoe, and a second gaging device arranged to contact with the corresponding end of the shoe, said gaging devices being mechanically connected to move simultaneously and relatively to locate a sole in proper relation to a shoe on the jack.

37. A machine for use in the manufacture of shoes having short outsoles having, in combination, a shoe supporting jack, a pair of positioning arms connected to be moved in unison and adapted to be moved toward each other into position to engage sole positioning surfaces at the heel seat end thereof, and a gaging member geared to the arms and arranged to move toward and from the shoe as the arms move back and forth to locate the end of the shoe in definite relation to the ends of the arms, said connection between the gaging devices being adjustable to permit proper placing of the shoe end in connection with the particular positioning surfaces being used.

38. A machine for use in the treatment of a short sole provided with surfaces at its rear end which are angularly related to its side edges and extend generally perpendicular to its plane and having definite predetermined relations to the contour of a finished shoe of which the sole forms a part when the sole shall have been incorporated therein, having, in combination, a mechanism for operating on the sole, and a gaging means constructed and arranged to extend over the shoe and to engage the said surfaces to orient the sole in its own plane relatively to the operating mechanism.

39. A machine for use in the treatment of a short outsole provided with concave surfaces located at substantially separated portions of the sole at its end and within the side edges thereof, extending generally perpendicular to its plane and having definite predetermined relations to the contour of a finished shoe of which the sole forms a part, when the sole shall have been incorporated therein, having, in combination, a mechanism for operating on the sole, and a gaging means constructed and arranged to enter the concavities of the said surfaces to orient the sole in its own plane relatively to the operating mechanism.

ERASTUS E. WINKLEY.

Certificate of Correction.

It is hereby certified that in Letters Patent No. 1,541,884, granted June 16, 1925, upon the application of Erastus E. Winkley, of Lynn, Massachusetts, for an improvement in "Machines for Use in the Manufacture of Shoes," errors appear in the printed specification requiring correction as follows: Page 9, line 17, claim 11, for the word "located" read *locate;* same page, line 70, claim 16, for the word "shaving" read *having;* page 11, line 30, claim 31, after the word "heel" insert the word *seat;* and that the said Letters Patent should be read with these corrections therein that the same may conform to the record of the case in the Patent Office.

Signed and sealed this 13th day of October, A. D. 1925.

[SEAL.]                                         KARL FENNING,
*Acting Commissioner of Patents.*